US012280384B1

(12) United States Patent
Schenk

(10) Patent No.: US 12,280,384 B1
(45) Date of Patent: Apr. 22, 2025

(54) SPRINKLER SYSTEM

(71) Applicant: HUSQVARNA AB, Huskvarna (SE)

(72) Inventor: Christoph Schenk, Oberdischingen (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/840,302

(22) PCT Filed: Dec. 13, 2022

(86) PCT No.: PCT/EP2022/085596

§ 371 (c)(1),
(2) Date: Aug. 21, 2024

(87) PCT Pub. No.: WO2023/156042

PCT Pub. Date: Aug. 24, 2023

(30) Foreign Application Priority Data

Feb. 21, 2022 (EP) .................................... 22157791

(51) Int. Cl.
*B05B 1/14* (2006.01)
*B05B 1/34* (2006.01)

(52) U.S. Cl.
CPC . *B05B 1/14* (2013.01); *B05B 1/34* (2013.01)

(58) Field of Classification Search
CPC .. B05B 1/14; B05B 1/34; B05B 1/265; B05B 1/267
USPC ....... 239/273–279, 500, 502, 504, 560, 561, 239/556, 557
See application file for complete search history.

(56) References Cited

U.S. PATENT DOCUMENTS 2,639,947 A * 5/1953 Schaub .................. B01D 3/008 239/504
2,746,792 A * 5/1956 Hough ...................... B05B 1/14 239/556
3,603,512 A * 9/1971 Ham ....................... F28F 25/06 239/504

(Continued)

FOREIGN PATENT DOCUMENTS

CN 205041229 U 2/2016
CN 106416945 A 2/2017

(Continued)

OTHER PUBLICATIONS

International Search Report & Written Opinion from corresponding International Application No. PCT/EP2022/085596 mailed Mar. 28, 2023, all pages cited in its entirety.

(Continued)

*Primary Examiner* — Steven J Ganey
(74) *Attorney, Agent, or Firm* — Burr & Forman LLP

(57) ABSTRACT

A sprinkler system (100) includes a body (110) defining a liquid channel (112). The liquid channel (112) is defined between an inlet (110A) and an outlet (110B) of the body (110) to allow flow of a liquid. A sprinkler head (118) is coupled to the body (110) and a plurality of nozzles (119) are disposed with the sprinkler head (118). The plurality of nozzles (119) defines a first nozzle (121) and at least one second nozzle (122). The sprinkler system (100) is characterizing in that the body (110) further defines at least one barrier (123) such that the at least one barrier (123) at least partially limits the flow of liquid from the outlet (1101B) towards the at least one second nozzle (119).

10 Claims, 7 Drawing Sheets

(56) References Cited

U.S. PATENT DOCUMENTS

| | | | | |
|---|---|---|---|---|
| 4,480,793 | A * | 11/1984 | Grande | B05B 1/14<br>239/567 |
| 5,240,184 | A | 8/1993 | Lawson | |
| 6,029,907 | A | 2/2000 | McKenzie | |
| 6,332,581 | B1 | 12/2001 | Chin et al. | |
| 7,325,753 | B2 | 2/2008 | Gregory et al. | |
| 8,727,237 | B2 | 5/2014 | Natterer | |
| 9,156,043 | B2 | 10/2015 | Walker | |
| 9,227,207 | B1 | 1/2016 | Bredberg et al. | |
| 9,662,668 | B1 | 5/2017 | Clark et al. | |
| 10,081,024 | B1 | 9/2018 | Hong | |
| 10,232,395 | B2 | 3/2019 | Klinefelter et al. | |
| 2006/0273192 | A1 | 12/2006 | Markley et al. | |
| 2014/0263735 | A1 | 9/2014 | Nations et al. | |

FOREIGN PATENT DOCUMENTS

| | | | |
|---|---|---|---|
| EP | 0301367 | B1 | 12/1993 |
| EP | 0761312 | B1 | 9/2001 |
| EP | 2086690 | B1 | 5/2014 |
| EP | 3398659 | A1 | 11/2018 |
| GB | 2560591 | A | 9/2018 |
| JP | 4315743 | B2 | 8/2009 |
| WO | 2008/084049 | A2 | 7/2008 |

OTHER PUBLICATIONS

International Preliminary Report on Patentability from corresponding International Application No. PCT/EP2022/085596 mailed May 6, 2024, all pages cited in its entirety.

* cited by examiner

SPRINKLER SYSTEM

TECHNICAL FIELD

The present disclosure relates to a sprinkler system. More specifically, the present disclosure relates to the sprinkler system which allows improved and customizable liquid distribution.

BACKGROUND

A sprinkler system (more specifically, an irrigational sprinkler) is a device which may be used to irrigate agricultural crops, lawns, landscapes, golf courses, and other areas. The sprinkler system may additionally be used for controlling airborne dust. The irrigational sprinkler system often involves a method of applying a liquid (say water) in a controlled manner in a way similar to rainfall.

However, there may be instances in which working with the sprinkling system may involve undesired overlaps, range constraints and other implementation challenges. Such challenges may be more pronounced for applications involving complex landscape shapes. This may cause excess liquid to be deposited in the areas where there is sprinkling overlap, thereby resulting in a substantial wastage of the liquid, waterlogging etc. Hence, an improved sprinkler system may be desired which may include a plurality of nozzles with different flow characteristics to overcome above mentioned deficiencies or drawbacks.

An example of a sprinkling system is provided in U.S. Pat. No. 9,662,668 (hereinafter referred to as '668 reference). The '668 reference provides an irrigation sprinkler that includes a riser and a nozzle mounted at an upper end of the riser for rotation. The sprinkler includes a high flow rate port and a low flow rate port that emits a stream of water. The sprinkler further includes a diverter valve that intermittently blocks or permits the flow of water to the high flow rate port or to the low flow rate port as the nozzle rotates. However, there is still a need for a better sprinkler system design that may overcome the problems such as undesired overlaps, range constraints, and the like without needing to block the flow of the liquid from any of the plurality of nozzles in the sprinkler system.

A further example of an irrigation sprinkler is provided in US patent application US 2006/0273192 A1 (hereinafter referred to as '192 reference). The irrigation sprinkler comprises a sprinkler nozzle having an outlet and an inlet in which a restrictor plate is mounted, wherein a chamber is delimited by the restrictor plate in front of the nozzle outlet. The nozzle outlet is a pair of spaced outlet orifices that combine to form the cross-sectional area of the outlet. The restrictor plate is a structure within the fluid flow path to control the fluid flow rate and pressure prior to the nozzle outlet. Additionally, the nozzle is configured to generate a consistent fluid stream regardless of the fluid pressure within a conduit of the irrigation sprinkler. That is the restrictor plate and the chamber allow the nozzle to have a substantially consistent fluid pressure, flow rate, and exit velocity at the nozzle outlet so that the stream throw distance is generally a consistent distance even if the fluid pressure in the conduit varies. Therefore, the '192 reference discloses the restrictor plate which equalizes the fluid flow prior to the nozzle outlet. Hence, the throw distance is equal for all of the outlet openings. However, the '192 reference does not disclose a barrier which at the same time at least partially limits the flow of liquid towards the at least one second nozzle, and does not interfere with the liquid towards the first nozzle. Hence, an improved sprinkler system may be desired which may include a plurality of nozzles with different flow characteristics to overcome above mentioned deficiency or drawback.

SUMMARY

In view of the above, it is an objective of the present invention to solve or at least reduce the drawbacks discussed above. The objective is at least partially achieved by a sprinkler system. The sprinkler system includes a body defining a liquid channel. The liquid channel is defined between an inlet and an outlet of the body to allow flow of a liquid. A sprinkler head is coupled to the body and a plurality of nozzles are disposed with the sprinkler head. The plurality of nozzles defines a first nozzle and at least one second nozzle. The sprinkler system is characterized in that the body further defines at least one barrier such that the at least one barrier at least partially limits the flow of liquid from the outlet towards the at least one second nozzle, and such that the flow of the liquid flowing out of the at least one second nozzle varies in flow characteristics relative to the liquid flowing out of the first nozzle.

Thus, the sprinkler system of the present disclosure advantageously includes at least one barrier such that the at least one barrier decreases the pressure of the liquid flowing towards the at least one second nozzle. Further, the at least one barrier also reduces the flow rate of the liquid flowing towards the at least one second nozzle. The flow of the liquid flowing out of the at least second nozzle thus varies in flow characteristics (say the flow rate, flow pressure, flow range etc.) relative to the liquid flowing out of the first nozzle. Therefore, the sprinkler system of the present disclosure advantageously provides customized flow patterns, ranges etc. as per application requirements.

According to an embodiment of the present disclosure, the at least one barrier includes at least one first barrier and at least one second barrier. The at least one first barrier is cylindrical in shape and at least one second barrier is arc-like in shape. The at least one first barrier and at least one second barrier have different shapes and sizes to provide customized flow patterns.

According to an embodiment of the present disclosure, the liquid channel is defined along an axis. A lateral distance of the at least one protrusion from the axis of the liquid channel is greater than a lateral distance of the at least one second nozzle from the axis of the liquid channel. Thus, the at least one protrusion is positioned in the body of the sprinkler system in a manner such that the at least one protrusion interferes with the flow of the liquid flowing towards the at least one second nozzle.

According to an embodiment of the present disclosure, the lateral distance of the at least one protrusion from the axis of the liquid channel is less than a lateral distance of the first nozzle from the axis of the liquid channel. Thus, the at least one protrusion is positioned in the body of the sprinkler system in a manner such that the at least one protrusion does not interfere with the flow of the liquid flowing towards the first nozzle.

According to an embodiment of the present disclosure, the outlet is offset from the axis of the liquid channel by a distance equal to or more than the lateral distance of the first nozzle from the axis of the liquid channel. The outlet is advantageously defined in a manner such that the liquid from the outlet needs to travel different distances to flow out from the first nozzle and the at least one second nozzle. Thus, the flow of the liquid flowing out from the first nozzle and the at least one second nozzle varies in the flow characteristics such as the flow pressure.

According to an embodiment of the present disclosure, an angle of the plurality of nozzles is adjustable with respect to the sprinkler head. The angle adjustment of the nozzles may improve or alter the sprinkling range, trajectory, or distances of the liquid stream on the irrigation field. Thus, more area on the irrigation field may be covered.

According to an embodiment of the present disclosure, the plurality of nozzles may have similar cross-sections. Further, in some embodiments of the present disclosure, the plurality of nozzles may have different cross-sections. The cross-section of the plurality of the nozzles may be different to provide different liquid streams having different profiles, ranges, and the like.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
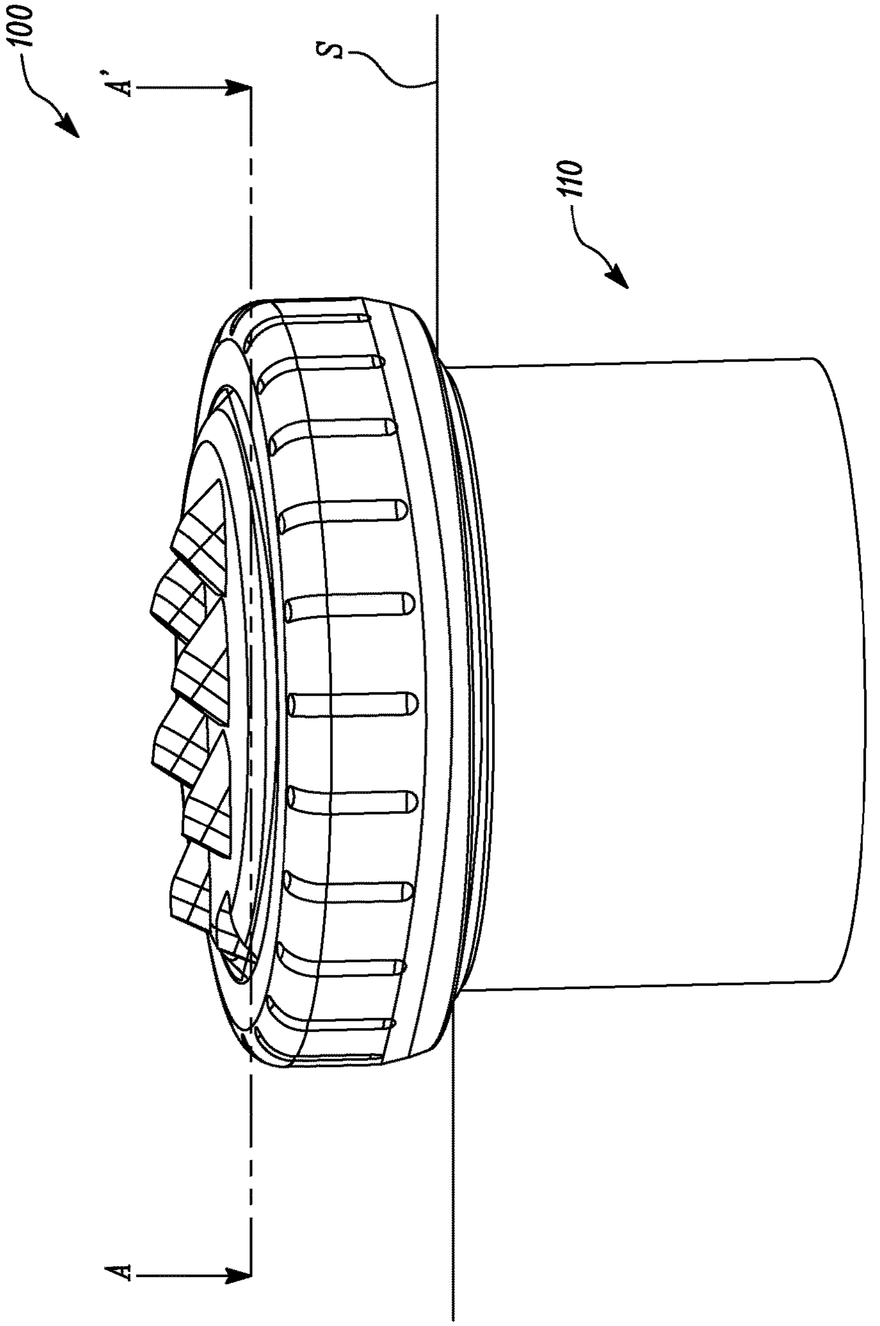
FIG. 1 illustrates a side perspective view of a sprinkler system, in accordance with an aspect of the present disclosure.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, “upper”, “lower”, “front”, “rear”, “side”, “longitudinal”, “lateral”, “transverse”, “upwards”, “downwards”, “forward”, “backward”, “sideward”, “left,” “right,” “horizontal,” “vertical,” “upward”, “inner”, “outer”, “inward”, “outward”, “top”, “bottom”, “higher”, “above”, “below”, “central”, “middle”, “intermediate”, “between”, “end”, “adjacent”, “proximate”, “near”, “distal”, “remote”, “radial”, “circumferential”, or the like, merely describe the configuration shown in the Figures. Indeed, the components may be oriented in any direction and the terminology, therefore, should be understood as encompassing such variations unless specified otherwise.

FIG. 1 illustrates a sprinkler system 100. The sprinkler system 100 of the present disclosure may be any device which finds application in outdoor (such as gardens, lawns, and the like) or indoor installations to supply or spray liquid in a controlled manner as per the requirement of the installations. The present disclosure may be implemented with any sprinkling system having a plurality of nozzles, such as with a sprinkler head and like arrangement, to sprinkle liquid in accordance with different factors such as sprinkling range, area, profile, among any other user preferences. In some embodiments, the sprinkler system 100 may be designed for use as an in-ground sprinkler. The sprinkling system 100 may be fixed to a ground surface “S”. In some embodiments, the sprinkling system 100 may also be used for above-ground surface “S” liquid operations. The liquid may be water, or any other liquid finding applications as would be obvious to a person having knowledge in the art. The present disclosure exemplary refers to water as the liquid, without any limitation, as it finds vast application in sprinkling of lawns, gardens, and the like.

Figure 2:
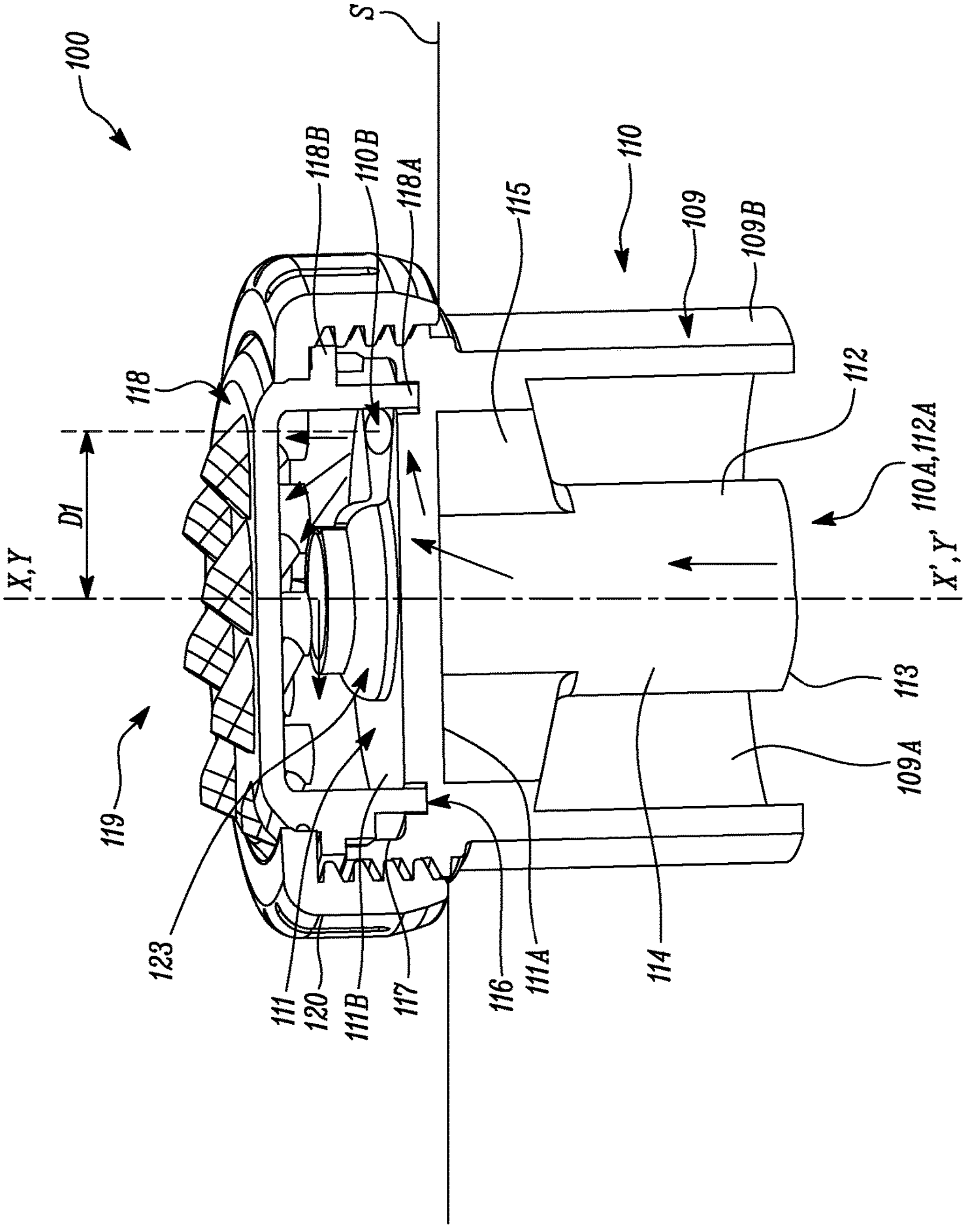
FIG. 2 illustrates a partial cut-away side perspective view of a sprinkler system of FIG. 1 along an axis A-A', in accordance with an aspect of the present disclosure.

The sprinkler system 100, as illustrated in FIG. 2, includes a body 110 along a central axis Y-Y'. The body 110 includes a side surface 109 and a top surface 111. The side surface 109 includes an inner wall 109A and an outer wall 109B such that the inner wall 109A faces opposite to the outer wall 109B.

Similarly, the top surface 111 includes an inner wall 111A and an outer wall 111B such that the inner wall 111A faces opposite to the outer wall 111B. The top surface 111 further defines a channel (not shown) between the inner wall 111A and the outer wall 111B.

The body 110 further defines a liquid channel 112 along an axis X-X'. The axis X-X' in the present disclosure coincides with the central axis Y-Y'. In some embodiments, the axis X-X' may be parallel to the central axis Y-Y' but may not coincide with the central axis Y-Y'. In some embodiments, the axis X-X' may be at an angle with the central axis Y-Y'. The angle may preferably vary from 0 degrees to 45 degrees. However, the present disclosure may account for other angles outside the preferred range without limiting the scope of the present disclosure in any manner.

The liquid channel 112 of the present disclosure mimics the shape of the commonly known and available cylindrical hoses. The liquid channel 112 of the present disclosure has a cylindrical cross-section. However, the liquid channel 112 may have any shape or cross-section that may allow flow of the liquid without limiting the scope of the present disclosure in any manner.

The liquid channel 112 includes an inlet 112A at a bottom end 113. Further, the liquid channel 112 includes an outlet (not shown) at a top end (not shown). Furthermore, the liquid channel 112 defines a side wall 114 between the top end and the bottom end 113 of the liquid channel. The liquid channel 112 or the side is coupled to the inner wall 109A of the body 110 by means of an annular bracket 115. The coupling between the side wall 114 and the annular bracket 115 and further between the annular bracket 115 and the inner wall 109A may be implemented by any means known and understood in the art. Further, the top end of the liquid channel 112 is fluidly coupled to the channel defined between the inner wall 111A and the outer wall 111B by any means known in the art without limiting the scope of the present disclosure in any manner.

With continued reference to FIG. 2, the liquid channel 112 is defined between an inlet 110A and an outlet 110B of the body 110 to allow flow of the liquid. For the purpose of the present disclosure, the inlet 110A of the body 110 coincides with the inlet 112A of the liquid channel 112. However, in actual implementation, the inlet 110A may be different from the inlet 112A. The inlets 110A, 112A may preferably have a circular shape. However, any other shape of the inlets 110A, 112A is within the scope of the present disclosure.

Further, the outlet 110B may coincide with the outlet of the liquid channel 112. However, for the purpose of the purpose of the present disclosure, the outlet 110B is at a lateral distance "D1" from the outlet of the liquid channel 112. The outlet 110B is at a lateral distance "D1" from the axis X-X'. The outlet 110B is at a lateral distance "D1" from the axis Y-Y'. The lateral distance "D1" is between the center of the outlet 110B and any of the axis X-X' or Y-Y'.

The outlet 110B is fluidly coupled to the outlet of the liquid channel 112 preferably via the channel defined between the inner wall 111A and the outer wall 111B. In some embodiments, the outlet 110B may be fluidly coupled to the outlet of the liquid channel 112 via a hose (not shown) by any means known in the art. However, in actual implementation of the present disclosure, the outlet 110B may be fluidly coupled to the outlet of the liquid channel 112 by any means without limiting the scope of the present disclosure.

Further, the outer wall 111B that defines the outlet 110B, furthermore defines an annular recess 116 and an annular step portion 117. The annular step portion 117 may be thought of as an annular stairs like portion. The annular recess 116 and the annular step portion 117 provides an engagement portion for a sprinkler head 118.

The sprinkler head 118 is coupled to the body 110 by virtue of secure engagement between an annular leg portion 118A of the sprinkler head 118 and the annular recess 116 and further between an annular protrusion 118B of the sprinkler head 118 and the annular step portion 117 by friction-fitting or any other coupling means commonly implemented in the related art. The engagement between the sprinkler head 118 and the body 110 is housed within a housing 120. The housing 120 is threadedly coupled to the body 110. Further a portion of the housing 120 is coupled to the annular protrusion 118B of the sprinkler head 118. The housing 120 may advantageously protect the coupling between the sprinkler head 118 and the body 110. The housing 120 may prevent the disengagement between the sprinkler head 118 and the body 110 due to external factors such as an inadvertent force released by an operator, environmental factors among others. The housing 120 may further add value to aesthetics of the sprinkler head 118 or the sprinkler system 100 as a whole. The housing 120 may further provide a gripping surface for the operator such that the operator may grip the housing 120 while embedding the sprinkler system 100 in the ground surface "S".

In some embodiments, the sprinkling system 100 may include a drive mechanism (not shown) which may drive the rotation of the sprinkler head 118 about the central axis Y-Y' or the axis X-X' relative to the ground surface "S". This may allow the sprinkler system 100 to produce different sprinkling profiles such as concentric sprinkling rings as the sprinkler head 118 is rotated about the central axis Y-Y' or the axis X-X' along which the liquid channel 112 is defined. The drive mechanism may include a motor (not shown), such as an electric motor e.g., stepper motor, or a motor with an encoder or a hydraulic motor that drives the rotation of the sprinkler head 118 relative to the ground surface "S".

In some embodiments, the sprinkler head 120 may be manufactured by three-dimensional printing (also known as additive manufacturing or 3D printing). Use of three-dimensional printing (alternatively, 3D printing) provides versatility of using different materials along with low lead-time in manufacturing and design of the sprinkler head 118.

Further with continued reference to FIG. 2, a plurality of nozzles 119 are disposed with the sprinkler head 118. The liquid from an external liquid source (not shown) reaches the inlet 110A or the inlet 112A via an external hose (not shown). The liquid enters the liquid channel 112 via the inlet 110A or the inlet 112A and flows through the liquid channel 112 towards the outlet of the liquid channel 112. Further, the liquid from the outlet of the liquid channel 112 flows towards the outlet 110B such that the liquid from the outlet 110B flows towards the plurality of nozzles 119 and finally gets sprinkled out from the sprinkler head 118 for further applications such as, but not limited to, irrigation of the ground surface "S".

Figure 5:
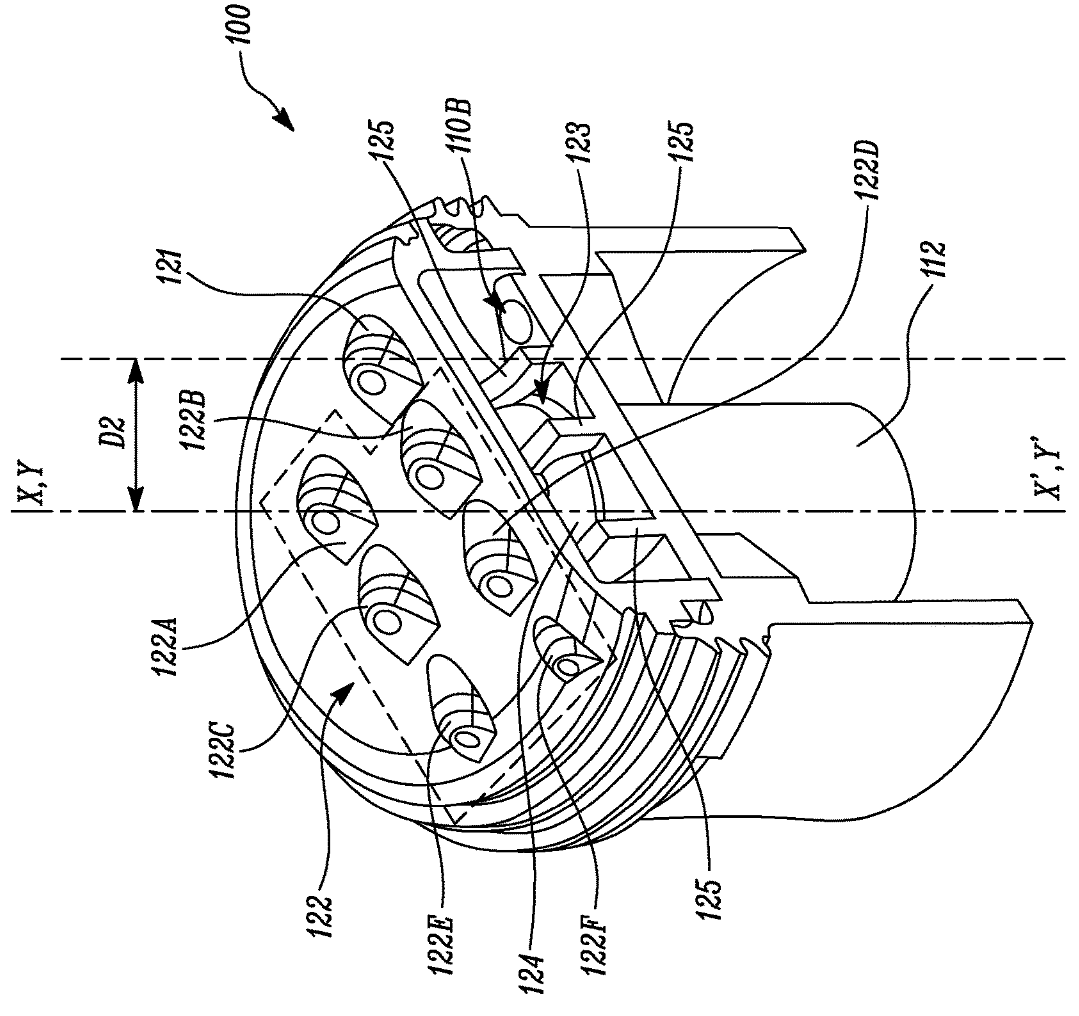
FIG. 5 illustrates a partial cut-away top perspective view of a sprinkler system of FIG. 1 along an axis A-A', in accordance with an aspect of the present disclosure.

Further with reference to FIGS. 2 and 5, the body 110 defines at least one barrier 123 such that the at least one barrier 123 at least partially limits the flow of liquid from the outlet 110B towards at least one second nozzle 122. The at least one barrier 123 interferes with the flow of liquid from the outlet 110B towards the at least one second nozzle 122 to vary the flow characteristics of the liquid. In some embodiments, the at least one barrier 123 may limit the amount of the liquid travelling towards the at least one second nozzle 122. In some embodiments, the at least one barrier 123 may completely block the flow of liquid towards the at least one second nozzle 122. In some embodiments, the liquid flowing towards the at least one second nozzle 122 may lose energy on collision with the at least one barrier 123. In some embodiments, the liquid flowing towards the at least one second nozzle 122 may lose pressure on collision with the at least one barrier 123. In some embodiments, the at least one barrier 123 may alter the flow rate from the at least one second nozzle 122. In some embodiments, the at least one barrier 123 may alter the flow range from the at least one second nozzle 122. Thus, the at least one barrier 123 may alter one or the other flow characteristics of the liquid flowing towards the at least one second nozzle 122.

In some embodiments, as illustrated in FIG. 2, the at least one barrier 123 is coupled to the outer wall 111B of the top surface 111 of the body 110. The coupling between the at least one barrier 123 and the outer wall 111B is operatively implemented by means of a plurality of brackets (not shown). However, the coupling between the at least one barrier 123 and the outer wall 111B may be implemented by any means known and understood in the related art without limiting the scope of the present disclosure in any manner. The at least one barrier 123 is coupled to the outer wall 111B of the top surface 111 in a manner such that a center of the at least one barrier 123 coincides with the axis X-X' of the liquid channel 112. The at least one barrier 123 is coupled to the outer wall 111B of the top surface 111 in a manner such that a center of the at least one barrier 123 coincides with the central axis Y-Y'. The at least one barrier 123 is coupled to the body 110 along the central axis Y-Y'. The at least one barrier 123 is coupled to the body 110 between the top surface 111 of the body 110 and the sprinkler head 118. The at least one barrier 123 is coupled to the body 110 between the top surface 111 of the body 110 and the plurality of nozzles 119.

However, in actual implementation of the present disclosure, the at least one barrier 123 may be at some lateral distance from the central axis Y-Y'. The at least one barrier 123 may be coupled to the top surface 111 of the body 110 at some lateral distance from the axis X-X' of the liquid channel 112 such that the lateral distance of the at least one barrier 123 from the axis X-X' of the liquid channel 112 is greater than the lateral distance of the at least one second nozzle 122 from the axis X-X' of the liquid channel 112. Thus, the at least one barrier 123 may be positioned in the body 110 of the sprinkler system 100 in the manner such that the at least one barrier 123 may interfere with the flow of the liquid flowing towards the at least one second nozzle 122. Similarly, the lateral distance of the at least one barrier 123 from the axis X-X' of the liquid channel 112 may be less than a lateral distance "D2" of a first nozzle 121 from the axis X-X' of the liquid channel 112 (as shown in FIG. 5) such that the at least one barrier 123 may be positioned in the body 110 of the sprinkler system 100 in the manner such that the at least one barrier 123 may not interfere with the flow of the liquid flowing towards the first nozzle 121.

In some embodiments, the at least one barrier 123 may be one barrier as illustrated in FIG. 2. However, in actual implementation, the at least one barrier 123 may be plurality of barriers as per the application requirement, space constraints, among other factors.

In some embodiments, the at least one barrier 123 as illustrated in FIG. 2 is cylindrical in shape. In some embodiments, the at least one barrier 123 may be cubical in shape. In some embodiments, the at least one barrier 123 may be conical in shape. However, in actual implementation of the present disclosure, the at least one barrier 123 may have any shape and size as per the application requirements.

In some embodiments, the at least one barrier 123 may be removably coupled with the top surface 111 of the body 110. The at least one barrier 123 may be removably coupled for easy maintenance, among other factors. In some embodiments, the at least one barrier 123 may be fixedly coupled with the top surface 111 of the body 110. The at least one barrier 123 may be formed in one-piece with the body 110 by any known manufacturing means. In some embodiments, the at least one barrier 123 may be pivotably coupled with the top surface 111 of the body 110.

In some embodiments, the at least one barrier 123 may be telescopic. The height of the at least one barrier 123 may be varied as per the application requirement by any mechanical or electronic means known and understood in the related art.

In some embodiments, the at least one barrier 123 may be a solid body. In some embodiments, the at least one barrier 123 may be rotatable such that the liquid flowing around the at least one barrier 123 may exhibit a rotating or a swirling motion. In some embodiments, the at least one barrier 123 may be a vibrating body.

In some embodiments, the at least one barrier 123 may be a hollow body. The hollow body may include one or more functional elements such that in some embodiments, the at least one barrier 123 may manipulate the temperature of the liquid flowing around the at least one barrier 123. In some embodiments, the at least one barrier 123 may spray fertilizer to the liquid flowing around the at least one barrier 123.

In some embodiments, the at least one barrier 123 may be an open container such that the container may contain a plurality of swellable balls. The swellable balls may enlarge upon absorption of liquid and interfere with the flow of the liquid. The swellable balls may be formed from hydrophilic materials.

Figure 3:
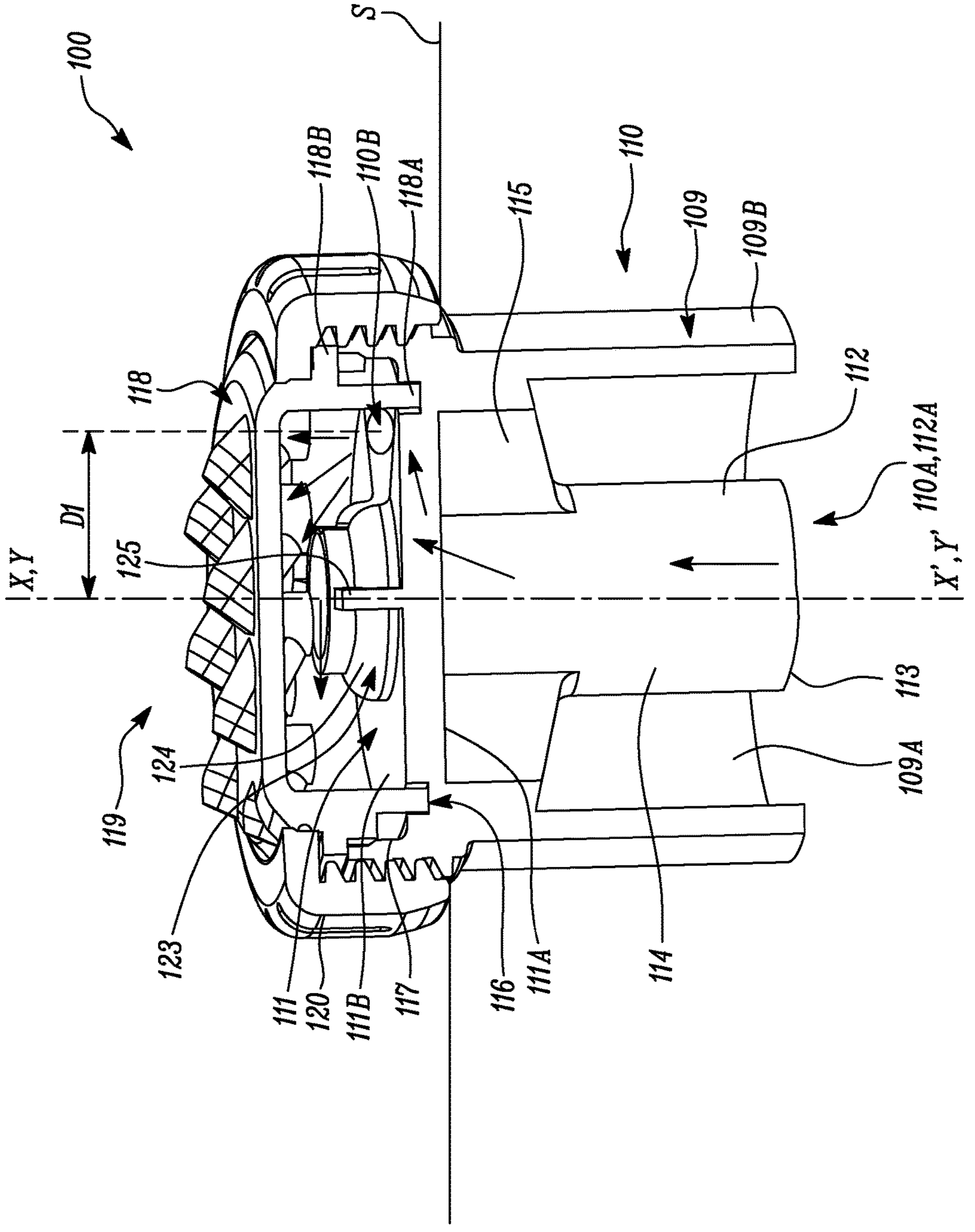
FIG. 3 illustrates a partial cut-away side perspective view of a sprinkler system of FIG. 1 along an axis A-A' with one first barrier and one second barrier, in accordance with an aspect of the present disclosure.

In some embodiments, the at least one barrier 123 may be a streamlined body that may reduce the frictional drag between the molecules or the particles of the liquid. In some embodiments, as illustrated in FIG. 3, at least one barrier 123 includes at least one first barrier 124 and at least one second barrier 125. The at least one first barrier 124 in conjunction with the at least one second barrier 125 at least partially limits the flow of liquid from the outlet 110B towards at least one second nozzle 122. The at least one first barrier 124 and the at least one second barrier 125 interfere with the flow of liquid from the outlet 110B towards the at least one second nozzle 122 to vary the flow characteristics of the liquid.

Figure 4:
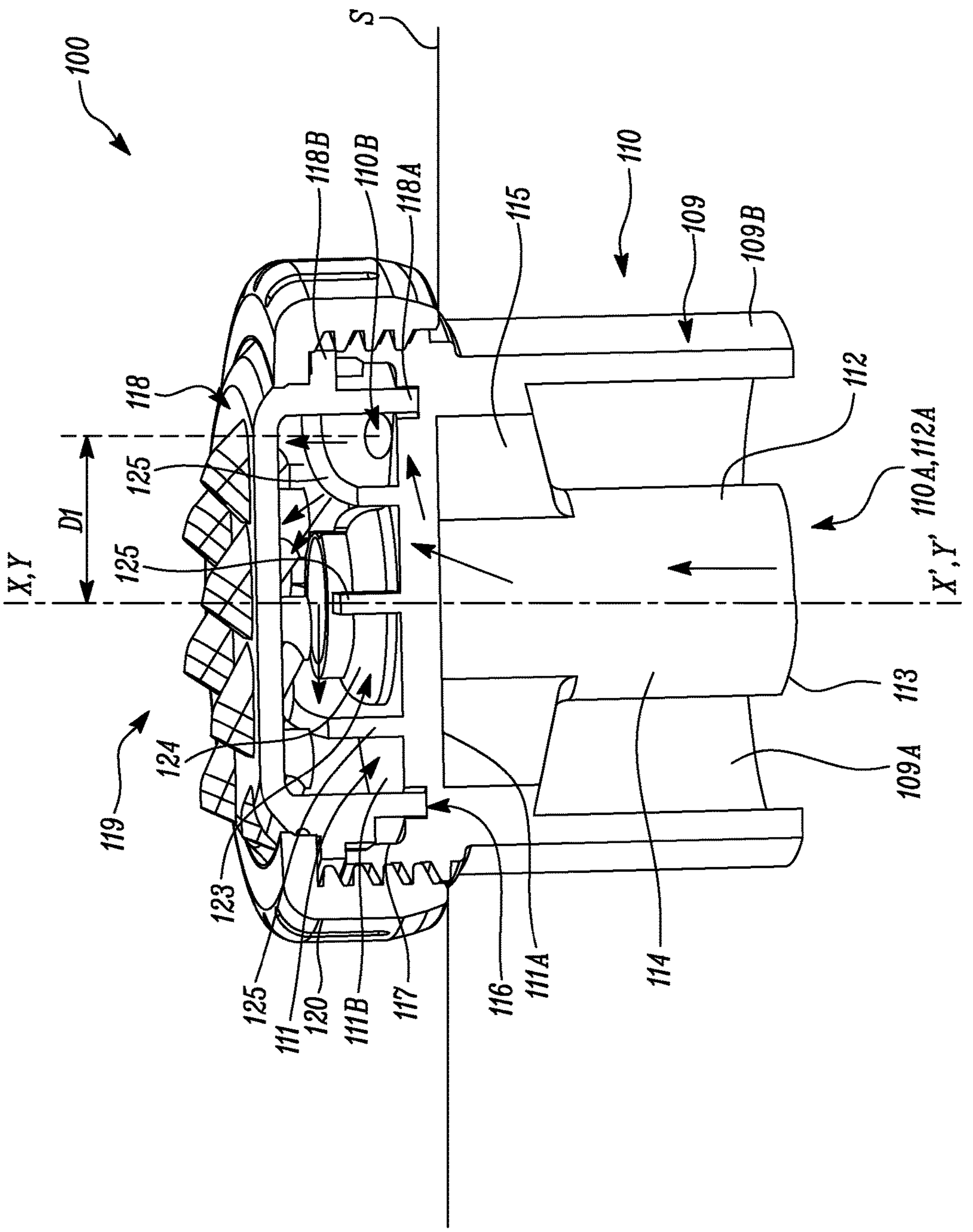
FIG. 4 illustrates a partial cut-away side perspective view of a sprinkler system of FIG. 1 along an axis A-A' with one first barrier and three second barriers, in accordance with an aspect of the present disclosure.

The at least one first barrier 124 and the at least one second barrier 125 as illustrated in FIG. 3 is one first barrier 124 and one second barrier 125. In some embodiments as illustrated in FIG. 4, the at least one first barrier 124 is one first barrier 124 and the at least one second barrier 125 are three second barriers 125. However, in the actual implementation of the present disclosure, the at least one first barrier 124 and the at least one second barrier 125 may be any number of barriers depending on the application requirement among other factors.

Further, as illustrated in FIG. 4, the one first barrier 124 has a cylindrical shape and the three second barriers 125 have a sector like or arc like shape. The arcs may be such that they have a common center at the outlet 110B. Thus, the arcs may be concentric. However, in actual implementation of the present disclosure, the one first barrier 124 and the three second barrier 125 may have any shape, size, position with respect to the outlet 110B depending on the application requirement. Further, the three second barriers 125 may vary in size relative to one another such that the second barrier 125 closer to the outlet 110B is smallest whereas the second barrier 125 farthest from the outlet 110B is largest. The second barrier 125 closer to the outlet 110B poses bare minimum restriction in the liquid flow, whereas the second barrier 125 farthest from the outlet 110B poses maximum restriction in the liquid flow.

In some embodiments, the at least one first barrier 124 and the at least one second barrier 125 may be telescopic. The height of the at least one first barrier 124 and the at least one second barrier 125 may be varied as per the application requirement by any mechanical or electronic means known and understood in the related art.

Further, it should be contemplated that the at least one barrier 123 may either include only the first barrier 124, or only the second barrier 125, or a combination of the first barrier 124 and the second barrier 125 in terms of parameters such as, but not limited to, number, placement, shapes, sized etc. The present disclosure envisions to include all such combinations in any manner within the scope of the present disclosure.

Figure 6:
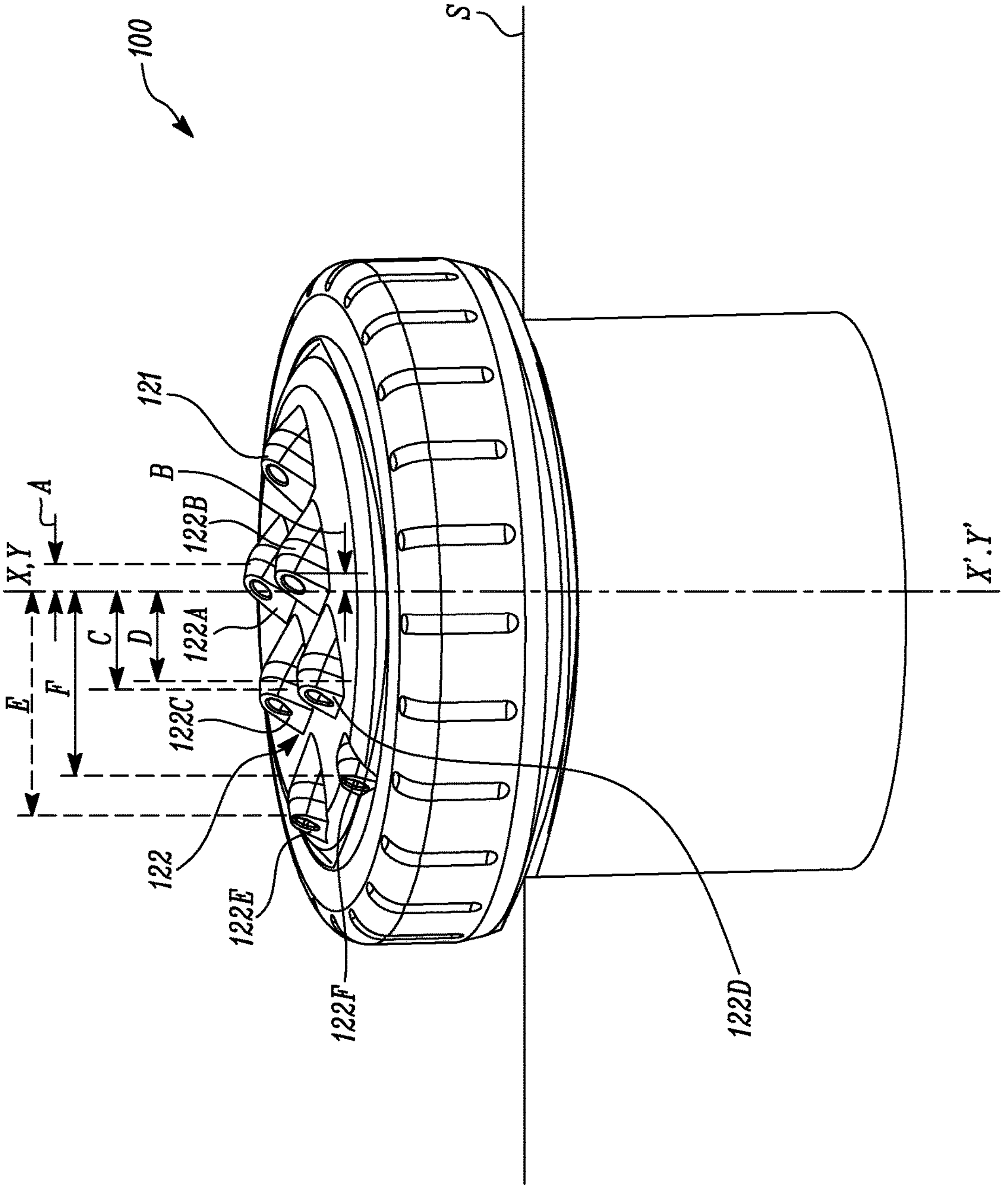
FIG. 6 illustrates a perspective view of a sprinkler system, in accordance with an aspect of the present disclosure.

The plurality of nozzles 119 of any of the FIGS. 2-4 are illustrated in detail in FIGS. 5 and 6. The plurality of nozzles 119 defines the first nozzle 121 and the at least one second nozzle 122. The first nozzle 121 is at a lateral distance "D2" from the from the outlet of the liquid channel 112. The first nozzle 121 is at a lateral distance "D2" from the axis X-X'. The first nozzle 121 is at a lateral distance "D2" from the axis Y-Y'. The lateral distance "D2" is between the center of the first nozzle 121 and any of the axis X-X' or Y-Y'. The center of the first nozzle 121 or any other nozzle from the plurality of nozzles 119 is the point around which a hole may be formed to receive the liquid from the outlet 110B of the body 110.

Further, the at least one second nozzle 122 as illustrated in FIGS. 5 and 6 may be any number of nozzles depending upon the application requirement, sprinkler head surface area, among other factors. However, for the implementation of the present disclosure, the at least one second nozzle 122 are six nozzles, 122A, 122B, 122C, 122D, 122E and 122F. The six nozzles 122A, 122B, 122C, 122D, 122E and 122F are at a lateral distance "A, B, C, D, E and F" respectively from the from the outlet of the liquid channel 112. The six nozzles 122A, 122B, 122C, 122D, 122E and 122F are at a lateral distance "A, B, C, D, E and F" respectively from the axis X-X'. The six nozzles 122A, 122B, 122C, 122D, 122E and 122F are at a lateral distance "A, B, C, D, E and F" respectively from the axis Y-Y'. The lateral distance "A, B, C, D, E and F" is respectively between the center of the six nozzles 122A, 122B, 122C, 122D, 122E and 122F and any of the axis X-X' or Y-Y'.

The outlet 110B and the plurality of nozzles 119 are thus at varying lateral distances "D1, D2, A, B, C, D, E and F" from any of the axis X-X' or Y-Y'. The outlet 110B is offset from the axis X-X' of the liquid channel 112 or the central axis Y-Y' by the distance "D1" equal to or more than the lateral distance "D2" of the first nozzle 121 from the axis X-X' of the liquid channel 112 or the central axis Y-Y' of the body 110 of the sprinkler system 100. The outlet 110B is advantageously defined in a manner such that the liquid from the outlet 110B needs to travel different distances to flow out from the first nozzle 121 and the at least one second nozzle 122.

As seen and interpreted from FIGS. 4, 5 and 6, the distance between the outlet 110B and the first nozzle 121 is minimum and the distance between the outlet 110B and the nozzle 122F is maximum. The distance between the outlet 110B and the first nozzle 121 may be exemplified as 110B-121 for the purpose of understanding of the present disclosure and the distance between the outlet 110B and the remaining nozzles of the plurality of nozzles 119 may be exemplified in the same manner. Thus, 110B-121<110B-122A<110B-122B<110B-122C<110B-122D<110B-122E<110B-122F. The liquid particles heading from the outlet 110B towards the nozzle 122F are required to travel more distance compared to the liquid particles heading from the outlet 110B towards other nozzles from the plurality of nozzles 119. Thus, the liquid particles heading towards the nozzle 122F may lose substantial energy on the way. The liquid particles heading towards the nozzle 122F may have comparatively less energy upon reaching 122F.

In a similar manner, the liquid particles heading from the outlet 110B towards the first nozzle 121 are required to travel significantly less distance compared to the liquid particles heading from the outlet 110B towards other nozzles from the plurality of nozzles 119. Thus, the liquid particles heading towards the first nozzle 121 may not lose any substantial energy on the way. The liquid particles heading towards the first nozzle 121 may have comparatively more energy upon reaching the first nozzle 121. Similar concept may be applied for understanding the energy levels of the liquid particles heading towards any other nozzles of the plurality of nozzles 119 too. In a simplified manner, it may be inferred that the greater the distance the liquid (or the liquid particles) need to travel, the lesser the energy they may possess for the irrigation application or any other applications. Thus, the flow of the liquid out from the first nozzle 121 and the at least one second nozzle 122 varies in the flow characteristics such as the flow pressure.

With continued reference to FIGS. 4, 5 and 6, the working of the sprinkler system 100 with the at least one barrier 123 may be understood. The liquid from the external liquid source (not shown) reaches the inlet 110A or the inlet 112A via an external hose (not shown). The liquid enters the liquid channel 112 via the inlet 110A or the inlet 112A and flows through the liquid channel 112 towards the outlet of the liquid channel 112. Further, the liquid from the outlet of the liquid channel 112 flows towards the outlet 110B such that the liquid from the outlet 110B flows towards the plurality of nozzles 119.

The flow of the liquid between the outlet 110B and the plurality of nozzles 119 is affected by the distance between the outlet 110B and the plurality of nozzles 119. Further, the flow of the liquid between the outlet 110B and the plurality of nozzles 119 is affected by the positioning of the at least one barrier 123 between the outlet 110B and the plurality of nozzles 119.

The flow of the liquid between the outlet 110B and the first nozzle 121 is not affected by the at least one barrier 123. Further, the distance between the outlet 110B and the first nozzle 121 is comparatively less when seen in comparison to the distance between the outlet 110B and the plurality of nozzles 119. Thus, there is no substantial energy loss as well for the liquid flowing from the outlet 110B towards the first nozzle 121. The first nozzle 121 may provide liquid flow with high flow rate and the widest throw range or flow range. The throw range is the distance travelled by the sprinkled liquid with respect to the central axis Y-Y'.

The flow of the liquid between the outlet 110B and the nozzle 122A is partly affected by the at least one barrier 123. Further, the distance between the outlet 110B and the nozzle 122A is comparatively less when seen in comparison to the distance between the outlet 110B and the nozzles 122A, 122B, 122C, 122D, 122E and 122F and just slightly greater when seen in comparison to the first nozzle 121. Thus, there is no substantial energy loss as well for the liquid flowing from the outlet 110B towards the nozzle 122A. The nozzle 122A may provide liquid flow with high flow rate and the widest throw range or flow range almost similar to the first nozzle 121.

The effect of the at least one barrier 123 is more on the nozzles 122B, 122C, 122D, 122E and 122F. The flow between the outlet 110B and the nozzles 122B, 122C, 122D, 122E and 122F is substantially affected by the at least one barrier 123. The liquid reaching the nozzles 122B, 122C, 122D, 122E and 122F gets partly deviated, blocked, loses kinetic energy etc., due to the collision with the at least one barrier 123. The affect is such that the nozzle 122F which is farthest from the outlet 110B provides liquid flow with lowest flow rate and the narrow throw range or flow range due to loss of energy and pressure. The loss in pressure is due to comparatively more distance travelled in comparison to the remaining plurality of nozzles 119 and comparatively more exposure to the interference of the at least one barrier 123. Thus, the flow rate and the throw range for the nozzle 121>nozzle 122A>nozzle 122B>nozzle 122C>nozzle 122D>nozzle 122E>nozzle 122F. Hence, different flow characteristics are achieved from the plurality of nozzles 119 in the single sprinkler head 118. The liquid from the plurality of nozzles 119 is finally sprinkled or sprayed for various applications, such as, but not limited to, irrigation.

Figure 7:
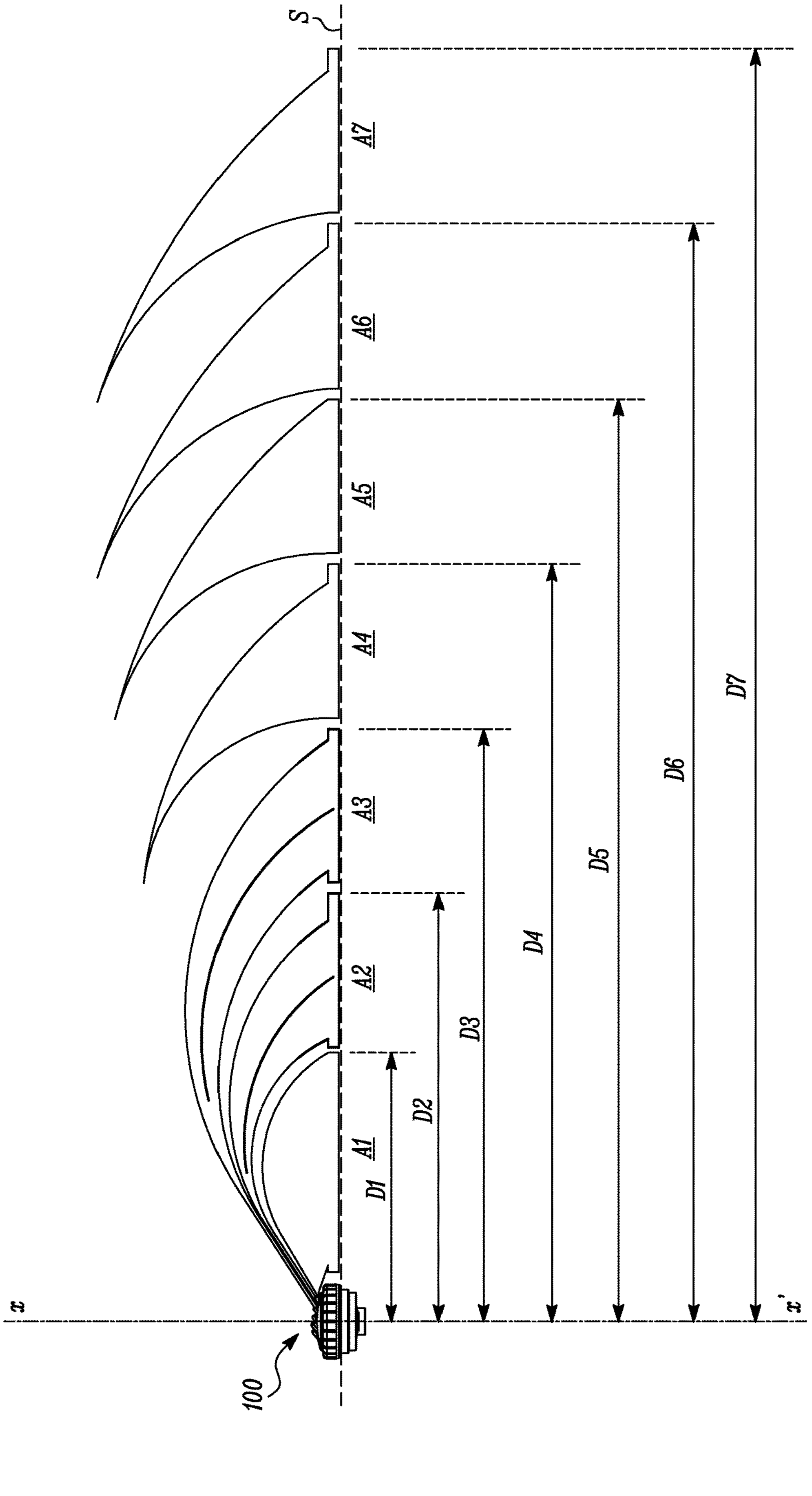
FIG. 7 illustrates a sprinkler system for liquid trajectories at different distances, in accordance with an aspect of the present disclosure.

In some embodiments, an angle $\alpha$ of the plurality of nozzles 119 as shown in FIG. 7 may be adjustable with respect to the sprinkler head 118. The angle adjustment of the plurality of nozzles 119 may improve or alter the sprinkling range, trajectory, or distances of the liquid stream on the irrigation field. Thus, more area on the irrigation field may be covered. In some embodiments, the angle $\alpha$ may be manually varied by the operator. In some embodiments, the angle α may be automatically varied by any means known in the art.

In some embodiments, the plurality of nozzles 119 may have similar cross-sections. The flow characteristics in these embodiments may be varied due to factors such as the interference of the liquid flow due to the at least one barrier 123 and distances between the outlet 110B and the plurality of nozzles 119.

Further, in some embodiments of the present disclosure, as shown in FIGS. 5 and 6, the plurality of nozzles 119 have different cross-sections. The different cross-sections further alter the flow characteristics of the plurality of nozzles 119 in conjunction with the already discussed factors such as the interference of the liquid flow due to the at least one barrier 123 and distances between the outlet 110B and the plurality of nozzles 119. The cross-sections of the plurality of nozzles 119 refers to the cross-sections of the liquid flowing area within each of the plurality of nozzles 119.

The nozzles 121, 122A and 122B have circular or oval or any similar shaped cross-section. The nozzles 121, 122A and 122B are thus well suited for providing desired liquid distribution at long distance or wide throw distance. The distance may be of the scale of 1.5 meters or more relative to the central axis Y-Y'. Further, the nozzles 122C, 122D, 122E and 122F have drop-shaped cross-section. The drop-shape may be referred to a cone with a hemispherical base. In particular with this application, the droplet shape of the nozzle cross-section implies that the section opening is narrowing at its one end while it forms an approximate circular contour on its other end. The nozzles 122C, 122D, 122E and 122F with drop-shaped cross-section are well suited for providing desired liquid distribution at narrow or shorter throw distances. The distance may be of the scale of 1.5 meters and less relative to the central axis Y-Y'.

However, in actual implementation of the present disclosure, the plurality of nozzles 119 may have other differently shaped cross-sections. The cross-sections of each of the plurality of nozzles 119 may be different with respect to each other. The cross-section of the plurality of the nozzles 119 may be different to provide different liquid streams having different profiles, ranges, and the like.

FIG. 7 shows an illustration of the sprinkler system 100 sprinkling liquid at different distances ("D1", "D2", "D3", "D4", "D5", "D6" and "D7") relative to the central axis Y-Y' on the ground surface "S". The distance is such that "D7">"D6">"D5">"D4">"D3">"D2">"D1". The distances "D1", "D2", "D3", "D4", "D5", "D6", and "D7" corresponds to areas "A1", "A2", "A3", "A4", "A5", "A6" and "A7" respectively. The nozzles 121, 122A, 122B, 122C, 122D, 122E and 122F based on already discussed factors such as the interaction of liquid with the at least one barrier 123, travelling distance and cross-section areas corresponds to throw distances "D7", "D6", "D5", "D4", "D3", "D2", "D1" and simultaneously areas "A7", "A6", "A5", "A4", "A3", "A2" and "A1".

Thus, the sprinkler system 100 of the present disclosure advantageously includes the at least one barrier 123 such that the at least one barrier 123 decreases the pressure or the energy of the liquid flowing towards the at least one second nozzle 122. Further, the at least one barrier 123 also reduces the flow rate of the liquid flowing towards and from the at least one second nozzle 122. The flow of the liquid flowing out of the at least second nozzle 122 thus varies in flow characteristics (say the flow rate, flow pressure, flow range etc.) relative to the liquid flowing out of the first nozzle 121.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Sprinkler System
109 Side Surface
109A Inner Wall
109B Outer Wall
110 Body
110A Inlet
110B Outlet
111 Top Surface
111A Inner Wall
111B Outer Wall
112 Liquid Channel
112A Inlet
113 Bottom End
114 Side Wall
115 Annular Bracket
116 Annular Recess
117 Annular Step Portion
118 Sprinkler Head
118A Annular Leg Portion
118B Annular Protrusion
119 Nozzles
120 Housing
121 First Nozzle
122 Second Nozzle
123 Barrier
124 First Barrier
125 Second Barrier
S Ground
X-X' Axis
Y-Y' Central Axis
D1 Lateral Distance
D2 Lateral Distance
A, B, C, D, E, F Lateral Distance
α Angle
D1, D2, D3, D4, D5, D6, D7 Distance
A1, A2, A3, A4, A5, A6, A7 Area

The invention claimed is:

1. A sprinkler system comprising:
a body defining a liquid channel, wherein the liquid channel is defined between an inlet and an outlet of the body to allow flow of a liquid;
a sprinkler head coupled to the body;
a plurality of nozzles disposed with the sprinkler head, wherein the plurality of nozzles defines a first nozzle and at least one second nozzle;
wherein the body further defines at least one barrier, and comprises an upper surface,
wherein the at least one barrier is coupled to the body between the top surface of the body and the plurality of nozzles,
wherein the at least one barrier is configured to at least partially limit the flow of liquid from the outlet towards the at least one second nozzle, and
wherein the at least one barrier is further configured to interfere with the flow of liquid from the outlet such that the flow of the liquid flowing out of the at least one second nozzle varies in flow characteristics relative to the liquid flowing out of the first nozzle.

2. The sprinkling system of claim 1, wherein the at least one barrier includes at least one first barrier and at least one second barrier.

3. The sprinkling system of claim 2, wherein the at least one first barrier is cylindrical in shape and at least one second barrier is arc-like in shape.

4. The sprinkling system of claim 1, wherein the liquid channel is defined along an axis.

5. The sprinkling system of claim 4, wherein a lateral distance of the at least one barrier from the axis is greater than a lateral distance of the at least one second nozzle from the axis.

6. The sprinkling system of claim 4, wherein the lateral distance of the at least one barrier from the axis is less than a lateral distance of the first nozzle from the axis.

7. The sprinkling system of claim 4, wherein the outlet is offset from the axis by a distance equal to or more than the lateral distance of the first nozzle from the axis.

8. The sprinkling system of claim 1, wherein an angle of the plurality of nozzles is adjustable with respect to the sprinkler head.

9. The sprinkling system of claim 1, wherein the plurality of nozzles have similar cross-sections.

10. The sprinkling system of claim 1, wherein the plurality of nozzles have different cross-sections.

* * * * *